United States Patent
Tao et al.

(10) Patent No.: US 9,031,013 B2
(45) Date of Patent: May 12, 2015

(54) IDENTIFIER-SHARING METHOD FOR WIRELESS COMMUNICATION DEVICES AND WIRELESS COMMUNICATION DEVICE AND BASE STATION USING THE SAME

(75) Inventors: Ming-Hung Tao, Tainan (TW); Ying-Chuan Hsiao, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 326 days.

(21) Appl. No.: 13/244,943

(22) Filed: Sep. 26, 2011

(65) Prior Publication Data

US 2012/0281619 A1 Nov. 8, 2012

Related U.S. Application Data

(60) Provisional application No. 61/482,947, filed on May 5, 2011.

(51) Int. Cl.
*H04W 4/00* (2009.01)
*H04W 8/26* (2009.01)
*H04W 72/12* (2009.01)

(52) U.S. Cl.
CPC ............. *H04W 4/005* (2013.01); *H04W 8/26* (2013.01); *H04W 72/1257* (2013.01)

(58) Field of Classification Search
CPC .... H04W 4/005; H04W 8/26; H04W 72/1257
USPC ......... 370/328–329, 335–336, 338, 341–343, 370/345, 395.3, 395.4, 395.41, 437, 370/441–443, 465
See application file for complete search history.

(56) References Cited

U.S. PATENT DOCUMENTS 7,778,151 B2 * 8/2010 Bertrand et al. ............... 370/208
7,835,319 B2 * 11/2010 Sugar ............................ 370/328
(Continued)

FOREIGN PATENT DOCUMENTS

CN 1879360 4/2010
CN 102047629 5/2011
(Continued)

OTHER PUBLICATIONS

"Office Action of Korea Counterpart Application" with English translation thereof, issued on Jun. 28, 2013, p. 1-p. 6, in which the listed references were cited.
(Continued)

*Primary Examiner* — Kevin Mew
(74) *Attorney, Agent, or Firm* — Jianq Chyun IP Office

(57) ABSTRACT

Identifier-sharing methods for wireless communication devices are proposed along with wireless communication devices and base stations using the same method. The proposed methods allow multiple M2M devices to share the same device identifier. The shared device identifier is valid for only one M2M device in a given time interval by a mechanism of assigning the same periodicity value and different offset values to the M2M devices associated with the shared device identifier. The proposed methods can also categorize M2M devices into different classes respectively based on their M2M application types. By adjusting periodicity value associated with the shared device identifier, a class associated with delay-tolerable applications can be allocated with more M2M devices sharing the same device identifier in comparison to the another class associated with delay-sensitive applications.

28 Claims, 9 Drawing Sheets

(56) References Cited

U.S. PATENT DOCUMENTS

| | | | |
|---|---|---|---|
| 7,917,121 B2* | 3/2011 | Kim et al. | 455/343.2 |
| 7,974,261 B2* | 7/2011 | Lane et al. | 370/350 |
| 7,990,840 B2* | 8/2011 | Laroia et al. | 370/208 |
| 8,472,359 B2* | 6/2013 | Bharghavan et al. | 370/310 |
| 8,520,617 B2* | 8/2013 | Krishnamurthy et al. | 370/329 |
| 2004/0227618 A1* | 11/2004 | Hwang et al. | 340/7.46 |
| 2005/0030931 A1* | 2/2005 | Sung et al. | 370/342 |
| 2006/0280199 A1* | 12/2006 | Lane et al. | 370/458 |
| 2007/0076650 A1* | 4/2007 | Manjeshwar et al. | 370/328 |
| 2009/0215472 A1* | 8/2009 | Hsu | 455/458 |
| 2009/0262684 A1* | 10/2009 | Khetawat et al. | 370/328 |
| 2010/0057485 A1 | 3/2010 | Luft | |
| 2011/0053619 A1 | 3/2011 | Shaheen et al. | |
| 2011/0222492 A1* | 9/2011 | Borsella et al. | 370/329 |
| 2011/0265158 A1* | 10/2011 | Cha et al. | 726/6 |
| 2012/0142336 A1* | 6/2012 | Van Phan et al. | 455/423 |
| 2012/0263106 A1* | 10/2012 | Lee et al. | 370/328 |
| 2012/0281555 A1* | 11/2012 | Gao et al. | 370/252 |
| 2013/0155954 A1* | 6/2013 | Wang et al. | 370/328 |
| 2013/0252610 A1* | 9/2013 | Kim et al. | 455/435.1 |
| 2014/0056249 A1* | 2/2014 | Park et al. | 370/329 |

FOREIGN PATENT DOCUMENTS

| | | |
|---|---|---|
| KR | 20040040280 | 5/2004 |
| KR | 20100113577 | 10/2010 |

OTHER PUBLICATIONS

Roger et al., "Part 16: Air Interface for Broadband Wireless Access Systems—Advanced Air Interface", IEEE P802.16m/D12, Feb. 17, 2011, pp. 1-1120.

3GPP Organizational Partners, "3rd Generation Partnership Project; Technical Specification Group Services and System Aspects; Service requirements for Machine-Type Communications", 3GPP TS 22.368, Mar. 2010, pp. 1-25.

Sierra Wireless, "Broadcasting MTC Access Control for Overload Control, Time Controlled and Device Triggers", 3GPP TSG SA WG2 Meeting #79, May 10-14, 2010, pp. 1-4.

Puthenkulam et al., "Machine to Machine (M2M) Communication PAR (Initial Working Draft)", IEEE 802.16 Broadband Wireless Access Working Group, Apr. 28, 2010, pp. 1-7.

Lee et al., "IEEE 802.16p Machine to Machine (M2M) System Requirements Document (SRD)", IEEE 802.16 Broadband Wireless Access Working Group, Jan. 13, 2011, pp. 1-8.

Murias et al., "Enhancements to Support Machine-to-Machine Applications", IEEE WirelessMAN 802.16p Amendment Working Document, Mar. 24, 2011, pp. 1-19.

Tao et al., "Shared-STID Addressing Scheme", IEEE 802.16 Broadband Wireless Access Working Group, Mar. 11, 2011, pp. 1-4.

Chen et al., "Cellular Based Machine to Machine Communication with Un-peer2peer Protocol Stack", Vehicular Technology Conference Fall, Sep. 20-23, 2009, pp. 1-5.

Martsola et al., "Machine to Machine Communication in Cellular Networks", 2nd International Conference on Mobile Technology, Applications and Systems, Nov. 15-17, 2005, pp. 1-6.

"Office Action of Taiwan Counterpart Application", issued on Feb. 24, 2014, p. 1-p. 5, in which the listed references were cited.

"LTE; Evolved Universal Terrestrial Radio Access (E-UTRA); Physical layer procedures (3GPP TS 36.213 version 10.1.0 Release 10)" ETSI TS 136 213 V10.1.0, Apr. 2011 Section 7.1, 7.2.2.

"3rdGeneration Partnership Project; Technical Specification Group Services and System Aspects; System Improvements for Machine-Type Communications; (Release 11)" 3GPP TR 23.888 V1.2.0 (Apr. 2011).

"Office Action of China Counterpart Application", issued on Jul. 23, 2014, p. 1-p. 9, in which the listed references were cited.

* cited by examiner

Monitoring downlink transmission or uplink transmission opportunity scheduled by a base station by using a device identifier along with a Valid Periodicity parameter and a Valid Offset parameter ~1002

FIG. 10

Scheduling downlink transmission or uplink transmission opportunity of a M2M device according to a Valid Periodicity parameter and a Valid Offset oparameter of the M2M device ~1102

IDENTIFIER-SHARING METHOD FOR WIRELESS COMMUNICATION DEVICES AND WIRELESS COMMUNICATION DEVICE AND BASE STATION USING THE SAME

CROSS-REFERENCE TO RELATED APPLICATION

This application claims the priority benefits of U.S. provisional application Ser. No. 61/482,947, filed on May 5, 2011. The entirety of the above-mentioned patent application is hereby incorporated by reference herein and made a part of this specification.

BACKGROUND

1. Technical Field

The disclosure generally relates to identifier-sharing methods for wireless communication devices and wireless communication devices and base stations using the same methods.

2. Related Art

Machine to Machine (M2M) communications (also called machine-type-communication, abbreviated as MTC) is a very distinct capability that enables the implementation of the "Internet of things". It is defined as information exchange between a subscriber station (or a wireless communication device) and a server in the core network (through a base station) or just between subscriber stations, which may be carried out without any human interaction. Several industry reports have scoped out huge potential for this market. Given the huge potential, some broadband wireless access systems, such as 3GPP LTE and IEEE 802.16m, have started to develop enhancements for enabling M2M communications.

M2M communications allow both wireless communication devices and wired communication devices to communicate with other devices of the same ability. M2M communications can use a device (such as a sensor or a meter) to capture an event (such as temperature, inventory level, etc.), which is relayed through a network (wireless, wired or hybrid) to an application server (M2M server), that translates the captured event into meaningful information (for example, items need to be restocked) to the subscriber user. FIG. 1 illustrates an overall M2M communication network architecture. Referring to FIG. 1, an M2M communication network can include a plurality of wireless communication devices of M2M applications (referred as M2M devices) 101, 102, 103, . . . , 10n, a communication network 120, at least an M2M server 130, and at least an M2M subscriber 140. The M2M devices 101, 102, 103, . . . , 10n are connected to the M2M server 130 through the communication network 120 (which can be a wireless communication network, a wired network or a hybrid of wireless and wired communication network). The M2M subscriber 140 is connected to the M2M server 130, and obtain information from the M2M server 130 through API, where the information is transmitted from M2M devices 101, 102, 103, . . . , 10n to the M2M server 130.

In recent years, the expansion of wireless communication networks across the world has made it far easier for M2M communications to take place and has lessened the amount of power and time necessary for information to be communicated between M2M machines. These communication networks also allow an array of new business opportunities and connections between consumers and producers in terms of the products being sold. Recent pilot projects reveal that M2M communication is also gaining traction in a number of new vertical sectors such as: health care, where M2M allows remote patient monitoring; and in logistics, where M2M improves package tracking and the distribution of goods from a central distribution centre.

With the growth of High speed wireless M2M applications, such as video surveillance, remote information display, and in-vehicle camera systems, utilizing high speed cellular technologies, such as WiMAX and 3GPP LTE system, becomes inevitable parts of M2M solutions. However, neither WiMAX nor LTE system provides enough addressing space for identifying a huge number of M2M devices. Here, the addressing space refers to the amount of available device identifiers which can be assigned all communication devices in a communication network.

Simply increasing the addressing space is not feasible since the original non-M2M devices may not be able to function well. Therefore, it is a major concern to develop a new addressing scheme utilizing the original addressing space to accommodate a huge number of devices including both M2M device and non-M2M devices.

SUMMARY

An identifier-sharing method for wireless communication devices is introduced herein. According to an exemplary embodiment, the identifier-sharing method for wireless communication devices includes following steps: a base station assigns an identical valid periodicity parameter to one or more wireless communication devices sharing an identical device identifier; and the base station assigns different valid offset parameters respectively to the wireless communication devices sharing the identical device identifier.

A base station is introduced herein. According to an exemplary embodiment, the base station is adapted for assigning identifiers to wireless communication devices, and includes a transceiver module and a communication protocol module. The transceiver module is configured for receiving signals from one or more wireless communication devices and transmitting signals to the wireless communication devices. The communication protocol module is connected to the transceiver module, and configured for assigning an identical valid periodicity parameter to the wireless communication devices sharing an identical device identifier, and assigning different valid offset parameters respectively to the wireless communication devices sharing the identical device identifier.

An identifier-sharing method for wireless communication devices is introduced herein. According to an exemplary embodiment, the identifier-sharing method for wireless communication devices includes following steps: a first wireless communication device receives an identifier from a base station, where the device identifier is shared with one second wireless communication device or a plurality of second wireless communication devices. The first wireless communication device receives a valid periodicity parameter from the base station, where the valid periodicity parameter is shared with the second wireless communication devices. The first wireless communication device receives a first valid offset parameter assigned from the base station, where the first valid offset parameter is different from a second valid offset parameter assigned to one of the second wireless communication devices by the base station.

A wireless communication device is introduced herein. According to an exemplary embodiment, the wireless communication device includes a transceiver module and a communication protocol module. The transceiver module is configured for receiving signals from a base station and transmitting signals to the base station. The communication protocol module is connected to the transceiver module, and configured for receiving a device identifier, a valid periodicity parameter, and a first valid offset parameter from the base station, where the wireless communication device shares the device identifier and the first valid periodicity parameter with a second wireless communication device or a plurality of second wireless communication devices, but the first valid offset parameter is different from a second valid offset parameter assigned to one of the second wireless communication devices by the base station.

An identifier-sharing method for wireless communication devices is introduced herein. According to an exemplary embodiment, the identifier-sharing method for wireless communication devices includes following steps: a wireless communication device monitors downlink transmission or uplink transmission opportunity scheduled by a base station by using a device identifier along with a valid periodicity parameter and a valid offset parameter.

A wireless communication device is introduced herein. According to an exemplary embodiment, the wireless communication device includes a transceiver module and a communication protocol module. The transceiver module is configured for receiving signals from a base station and transmitting signals to the base station. The communication protocol module is connected to the transceiver module, and configured for monitoring downlink transmission or uplink transmission opportunity scheduled by a base station by using a device identifier along with a valid periodicity parameter and a valid offset parameter.

An identifier-sharing method for wireless communication devices is introduced herein. According to an exemplary embodiment, the identifier-sharing method for wireless communication devices includes following steps: a base station schedules downlink transmission or uplink transmission opportunity of a wireless communication device according to a valid periodicity parameter and a valid offset parameter of the wireless communication device.

A base station is introduced herein. According to an exemplary embodiment, the base station includes a transceiver module and a communication protocol module. The transceiver module is configured for receiving signals from one or more wireless communication devices and transmitting signals to the wireless communication devices. The communication protocol module is connected to the transceiver module, and configured for scheduling downlink transmission or uplink transmission opportunity of a wireless communication device according to a valid periodicity parameter and a valid offset parameter of the wireless communication device.

Several exemplary embodiments accompanied with figures are described in detail below to further describe the disclosure in details.

BRIEF DESCRIPTION OF DRAWINGS

The accompanying drawings are included to provide further understanding, and are incorporated in and constitute a part of this specification. The drawings illustrate exemplary embodiments and, together with the description, serve to explain the principles of the disclosure.

FIG. 10 is a flowchart illustrating another identifier-sharing method for wireless communication devices according to an exemplary embodiment.

FIG. 11 is a flowchart illustrating another identifier-sharing method for wireless communication devices according to an exemplary embodiment.

DETAILED DESCRIPTION

Figure 1:
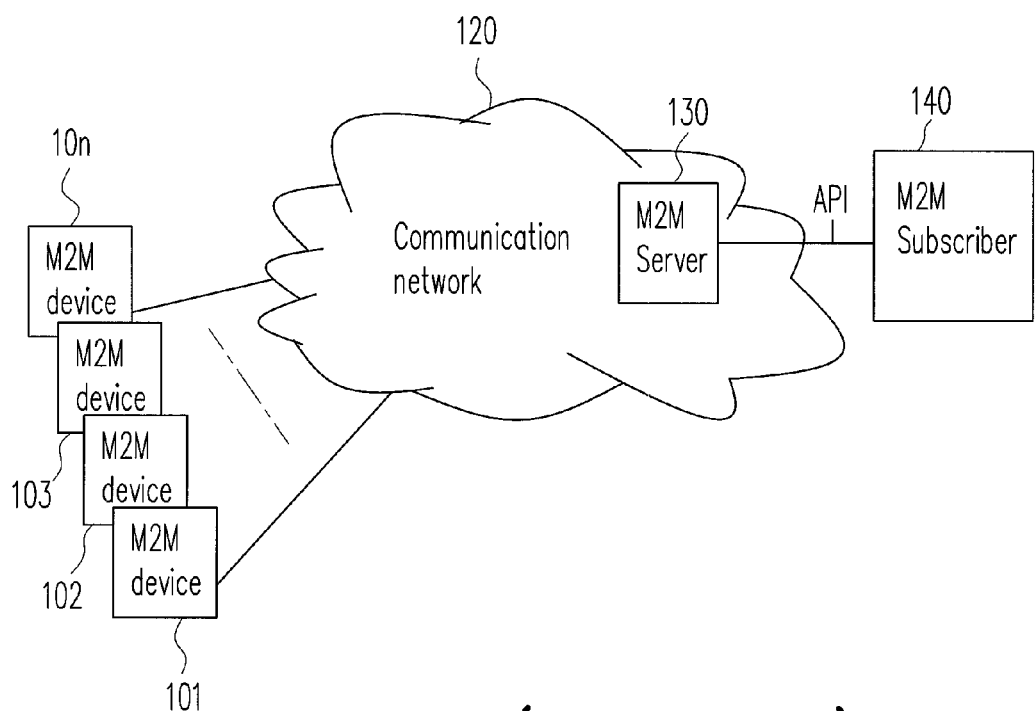
FIG. 1 illustrates an overall M2M communication network architecture.

Some embodiments of the present application will now be described more fully hereinafter with reference to the accompanying drawings, in which some, but not all embodiments of the application are shown. Indeed, various embodiments of the application may be embodied in many different forms and should not be construed as limited to the embodiments set forth herein; rather, these embodiments are provided so that this disclosure will satisfy applicable legal requirements. Like reference numerals refer to like elements throughout.

In the present disclosure, an identifier-sharing scheme for M2M communication in cellular communication system is proposed. The proposed scheme uses limited addressing space to identify both M2M and non-M2M devices without impacting the original addressing scheme for non-M2M devices. The proposed scheme can support a large number of M2M devices for various M2M applications. The proposed identifier-sharing methods for Machine to Machine (M2M) devices can satisfy the requirements of assigning device identifiers to a potentially huge number of M2M devices in a communication network. There are also proposed wireless communication devices and base stations using the same methods. The conventional communication protocols are modified so as to accommodate a huge number of devices including both M2M device and non-M2M devices.

Throughout the disclosure, a wireless communication device can refer to a user equipment (UE), a mobile station, an advanced mobile station, a wireless terminal communication device, an M2M device, a MTC device, and so fourth. The wireless communication device can be, for example, a digital television, a digital set-top box, a personal computer, a notebook PC, a tablet PC, a netbook PC, a mobile phone, a smart phone, a water meter, a gas meter, an electricity meter, an emergency alarm device, a sensor device, a video camera, and so fourth. Also, the base station (BS) can refer to an advanced base station, a node B, an enhanced node B (eNB), and so fourth.

In the present disclosure, the term "downlink" (DL) refers to the RF signal transmission from a base station to a wireless communication device within the radio coverage of the base station; the term "uplink" (UL) refers to the RF signal transmission from a wireless communication device to its access base station.

Firstly, in the proposed identifier-sharing methods for wireless communication devices, a communication system or a base station in a wireless communication system can assign the same device identifier to a plurality of M2M devices, by allowing the device identifier to be valid for only one M2M device in a given time interval (or a predetermined time interval). Secondly, the number of M2M devices sharing an identical device identifier can be adaptively varied by the base station, depending on the application type of the M2M devices sharing the identical device identifier. This means that the communication system or the base station can allow many M2M devices of first type to share a first device identifier, when these M2M devices of first type belong to delay-tolerable applications; also, the system can allow only few M2M devices of second type to share a second device identifier, when these M2M devices of second type belong to delay-sensitive applications. In addition, the aforementioned predetermined time interval can be adaptively adjusted by the base station according to at least a device density of the base station or application types of M2M applications.

The proposed identifier-sharing methods for wireless communication devices can be applied (but not limited) to an M2M communication system using IEEE 802.16m (Advanced WirelessMAN-OFDMA) radio access technology as the interface between the M2M device and M2M communication compatible base station. Also, the proposed identifier-sharing methods for wireless communication devices can be applied to other communication system such as LTE system.

Figure 2:
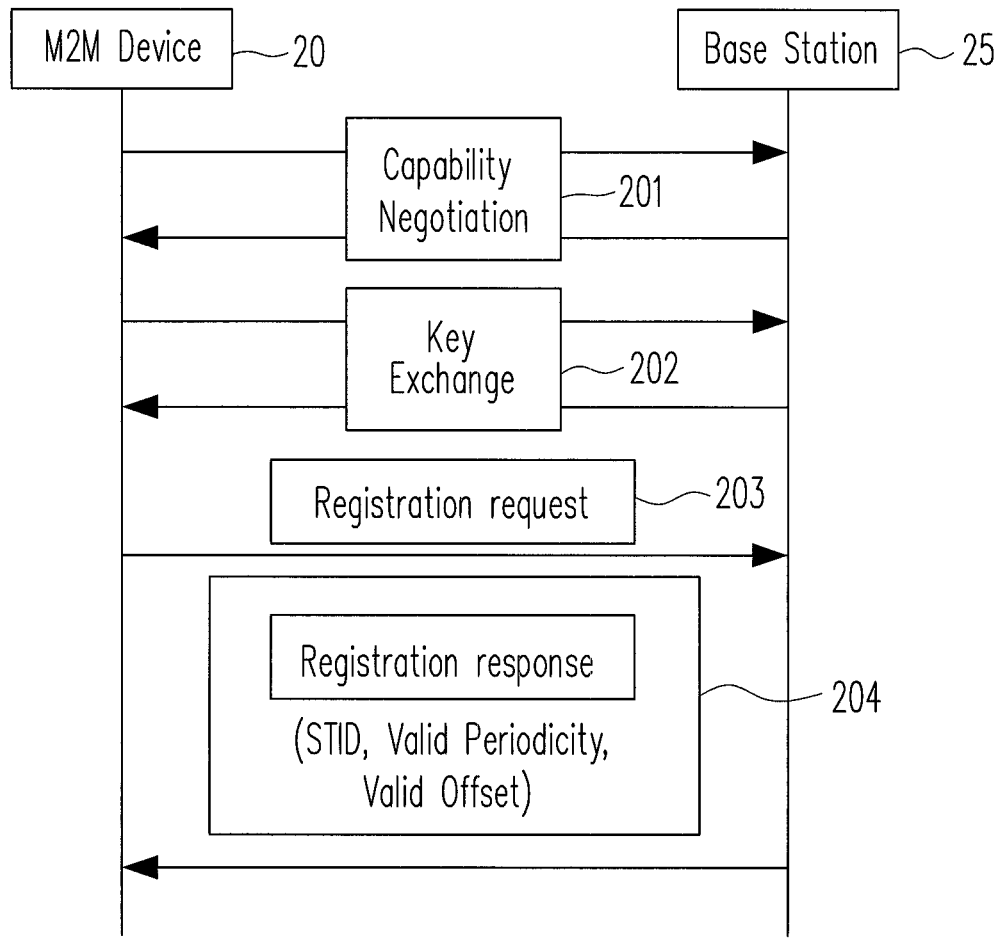
FIG. 2 illustrates a network entry process according to an exemplary embodiment of the present disclosure.

FIG. 2 illustrates a network entry process according an exemplary embodiment of the present disclosure. The proposed network entry process is modified from a conventional network entry process and can be applied to a M2M communication system. Referring to FIG. 2, when being turned on, an M2M device 20 configured to use the proposed identifier-sharing methods firstly scans and synchronizes with a target cell (or a base station 25), then perform ranging, capability negotiation (step 201), key exchange (step 202), and registration with the target cell (step 203 and step 204). In the step 203, the M2M device 20 transmits a registration request to the base station 25. In the step 204, the base station 25 transmits a registration response to the M2M device 20 as a response to the registration request.

After completing the registration procedure, the network entry process is completed and the M2M device 20 obtains a Station Identifier (STID) from the base station 25. Similarly in the LTE system, a M2M device obtains a Cell Radio Network Temporary Identity (C-RNTI) value from an eNB after the registration procedure. The STID or the C-RNTI value can be used as the device identifier of the M2M device. For example, the STID obtained by the M2M device 20 can be used to identify the M2M device 20 during any future (or further) operation(s) taken place between the base station 25 and the M2M device 20 (or a mobile station). It is noted that the base station 25 in the present disclosure can assign the same STID to different M2M devices in order to save the addressing space. The operation rule of these M2M devices sharing the same device identifier (which can be a STID or a C-RNTI value) will be further described in details.

In the present embodiment, the base station 25 can recognize a wireless communication device as an M2M device through the capability negotiation procedure (labelled as the step 201), and then assigns the STID to the M2M device 20 through the registration process (including the step 203 and the step 204). During the registration process, the base station 25 transmits a registration response (such as an AAI-REG-RSP message) including at least a 'STID' parameter, a 'Valid Periodicity' parameter, and a 'Valid Offset' parameter to the M2M device 20 in response to the registration request (such as an AAI-REG-REQ message), as shown in FIG. 2.

In case that the base station 25 decides to assign a STID which is already assigned to or is going to be assigned to other M2M devices, the base station 25 assigns a value which is greater than '1' to the Valid Periodicity parameter; otherwise, the base station 25 assigns the value '1' to the Valid Periodicity parameter. The base station 25 always assigns a value, which is smaller than Valid Periodicity value, to the Valid Offset parameter. It is noted that for the M2M devices sharing the same STID, their Valid Periodicity values are identical, and their Valid Offset values shall be different from each other.

If a STID is shared by multiple M2M devices, each of the M2M devices sharing the same STID can only apply this STID as its device identifier in certain time periods (or in predetermined frames), depending on its assigned Valid Periodicity and Valid Offset parameters. To be illustrated more specifically, the M2M device can apply the STID as its device identifier whenever the condition of following equation is met.

$$\text{FRAMENUMBER mod Valid\_Periodicity=Valid\_Offset} \qquad \text{equation (1)},$$

where FRAMENUMBER refers to frame sequence numbers of the frames, mod refers to a modulo function, Valid_Periodicity refers to the valid periodicity parameter, and Valid_Offset refers to the valid offset parameter. Further, FRAMENUMBER also denotes the current frame sequence number of the communication system. The M2M device can only use the STID when the condition in the equation (1) is satisfied.

Figure 3:
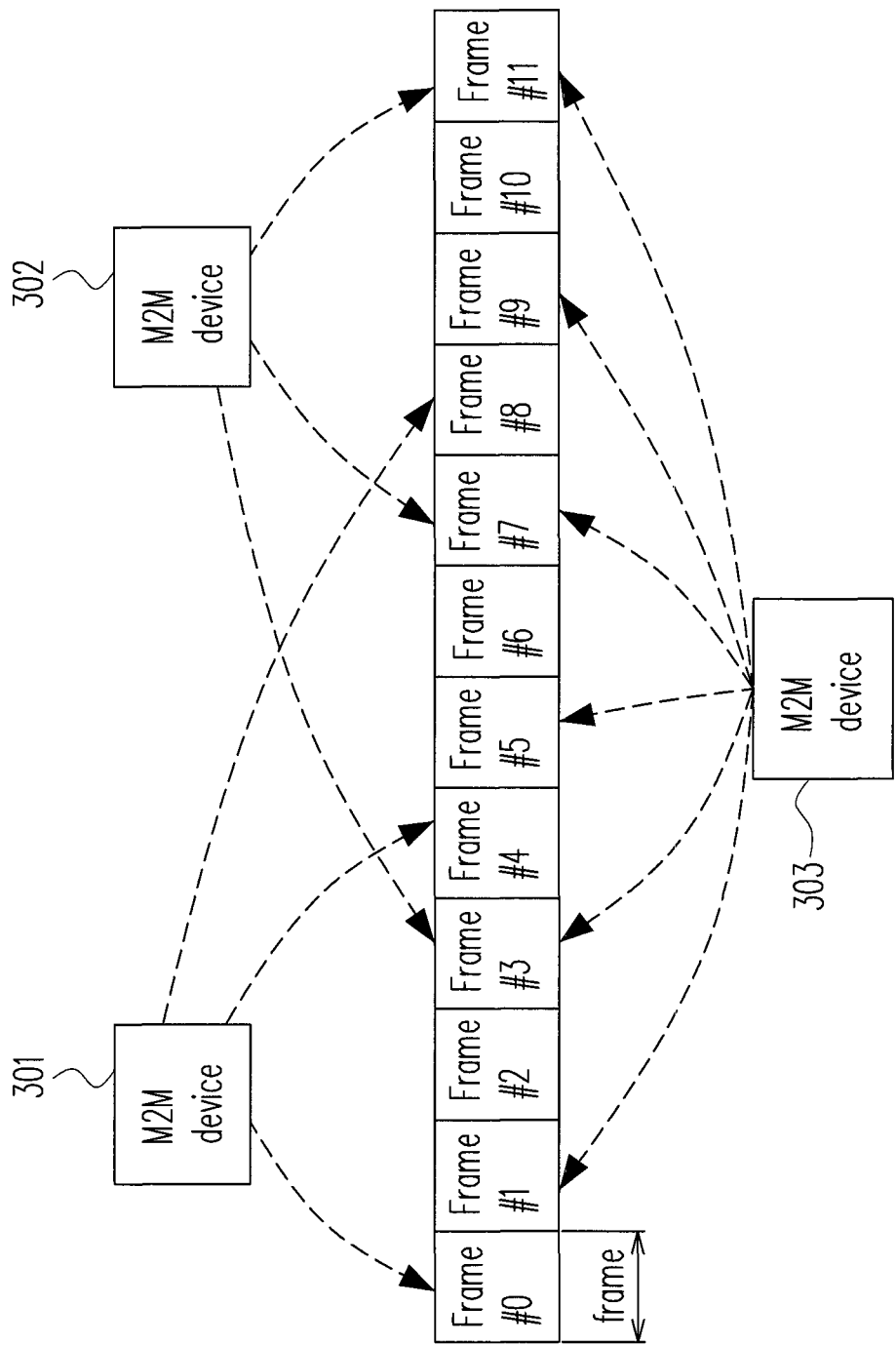
FIG. 3 illustrates an example of allocating frames according to valid periodicity parameter and valid offset parameter.

FIG. 3 illustrates an example of allocating frames according to Valid Periodicity parameter and Valid Offset parameter. Referring to FIG. 3, an M2M device 301 is previously assigned a Valid Periodicity parameter being equal to 4 and a Valid Offset parameter being equal to 0; an M2M device 302 is previously assigned a Valid Periodicity parameter being equal to 4 and a Valid Offset parameter being equal to 3; an M2M device 303 is previously assigned a Valid Periodicity parameter being equal to 2 and a Valid Offset parameter being equal to 1. The M2M device 301 and M2M device 302 share the same device identifier, but the M2M device 301 can only use the shared device identifier in frame #0, frame #4, and frame #8, and the M2M device 302 can only use the shared device identifier in frame #3, frame #7, and frame #11, since the M2M device 302 has a different Valid Offset value than that of the M2M device 301. Further, the M2M device 303 can only perform uplink transmission or receive downlink transmission by using its device identifier (or shared device identifier) in frame #1, frame #3, frame #5, frame #7, frame #9, and frame #11.

In order to receive unicast downlink traffic, an M2M device monitors the assigned STID at the frame where the STID is valid for the M2M device according to the condition in equation (1). On the other hand, whenever the base station has unicast downlink traffic pending for an M2M device, the base station can allocate the traffic to the M2M device at the frame where the STID is valid to the M2M device. When the base station is going to allocate an uplink transmission opportunity to an M2M device, the base station can also allocate the opportunity to the M2M device via STID at the frame where the STID is valid for the M2M device.

Figure 4:
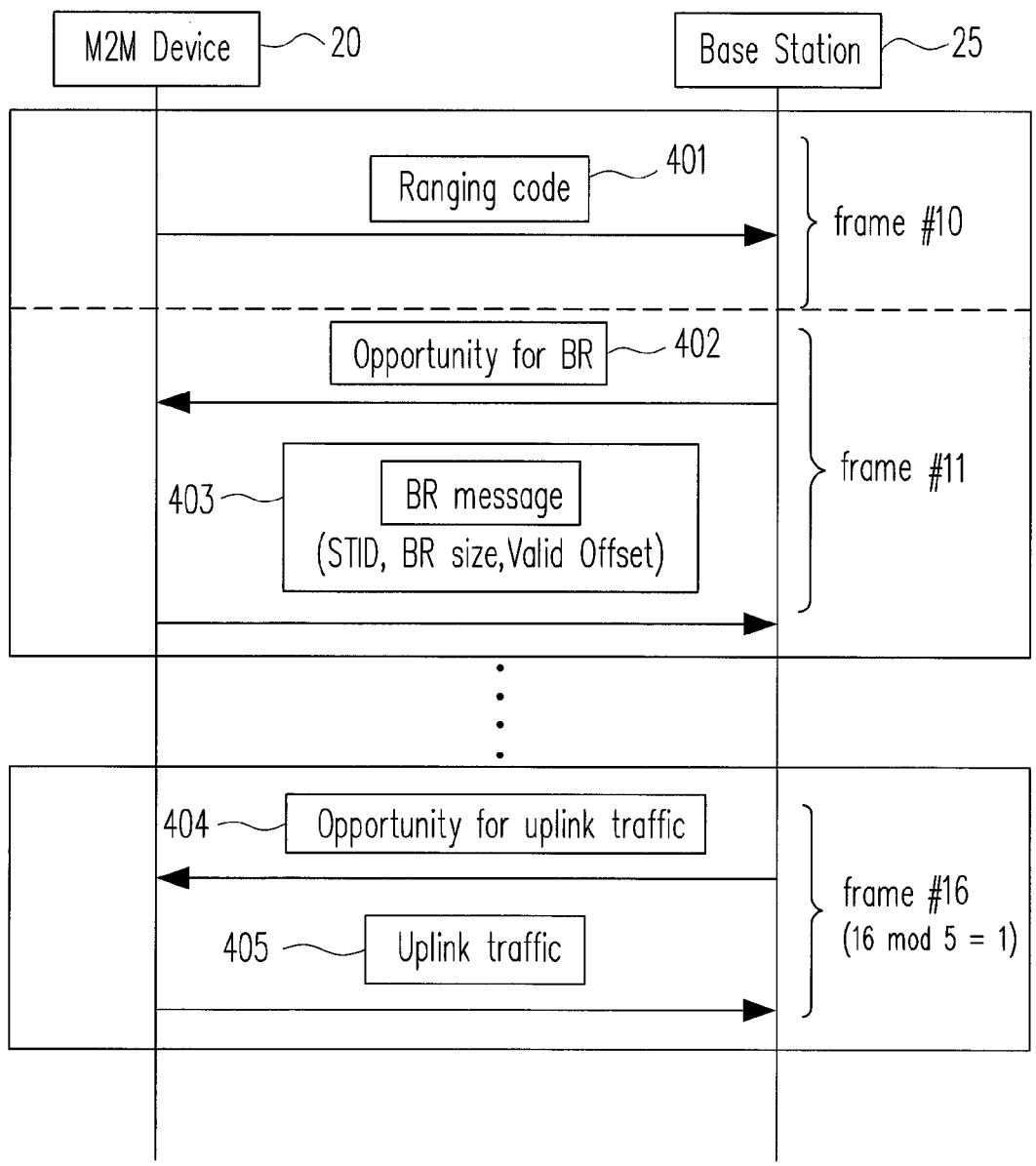
FIG. 4 illustrates a bandwidth request process according to an exemplary embodiment of the present disclosure.

FIG. 4 illustrates a bandwidth request process according to an exemplary embodiment of the present disclosure. Referring to FIG. 4, when an M2M device needs more bandwidth for uplink transmission, according to the IEEE 802.16m standard, the M2M device can firstly signal (or transmit) a ranging code to request an uplink transmission opportunity for submitting its bandwidth request (BR) message. For example, the M2M device 20 transmits the ranging code to the base station 25 to request an uplink transmission opportunity (step 401) in frame #10.

After successfully decoding the ranging code, the base station 25 can grant an uplink transmission opportunity to the M2M device 20 by signaling the ranging code. For example, the base station 25 is previously assigned a Valid Periodicity parameter being 5 and a Valid Offset parameter being 1, so the base station transmits an opportunity for BR to the M2M device 20 (step 402) in frame #11.

Then, the M2M device can utilize the granted uplink opportunity to submit its BR message including the STID of the device and the size of the required bandwidth.

However, in the present disclosure, the BR message also includes a Valid Offset parameter so that the base station can know which M2M device is requesting the bandwidth while the STID is shared by multiple M2M devices. For example, the M2M device 20 transmits its BR message, containing its STID, the required BR size, and its assigned Valid Offset parameter to the base station 25 (step 403) in the frame #11.

After recognizing which M2M device is requesting the bandwidth and how much bandwidth the M2M device requests for, the base station then grants the corresponding uplink transmission opportunity to the M2M device at the frame where the STID is valid to the M2M device. For example, the base station 25 transmits a signal indicating an opportunity for uplink traffic to the M2M device 20 (step 404) in frame #16. The frame sequence number of the frame #16 is 16, and a computation result of "16 mod 5" being 1 indicates that the frame #16 is valid for the base station 25 transmits opportunity for uplink traffic. This also indicates that the M2M device 20 can use the frame #16 for transmitting its uplink traffic (step 405).

In the present embodiment, whenever a base station receives a packet from an M2M device, it shall determine the Valid Periodicity parameter and Valid Offset parameter of the M2M device based on the STID and the current frame sequence number. Then, when the base station has any response to the received packet, it shall wait for a predetermine time period equal to "n*Valid Periodicity" of frames, and then transmits the response to the M2M device, where '*' refers to multiplication operation, n is an integer, and n>0.

Figure 5:
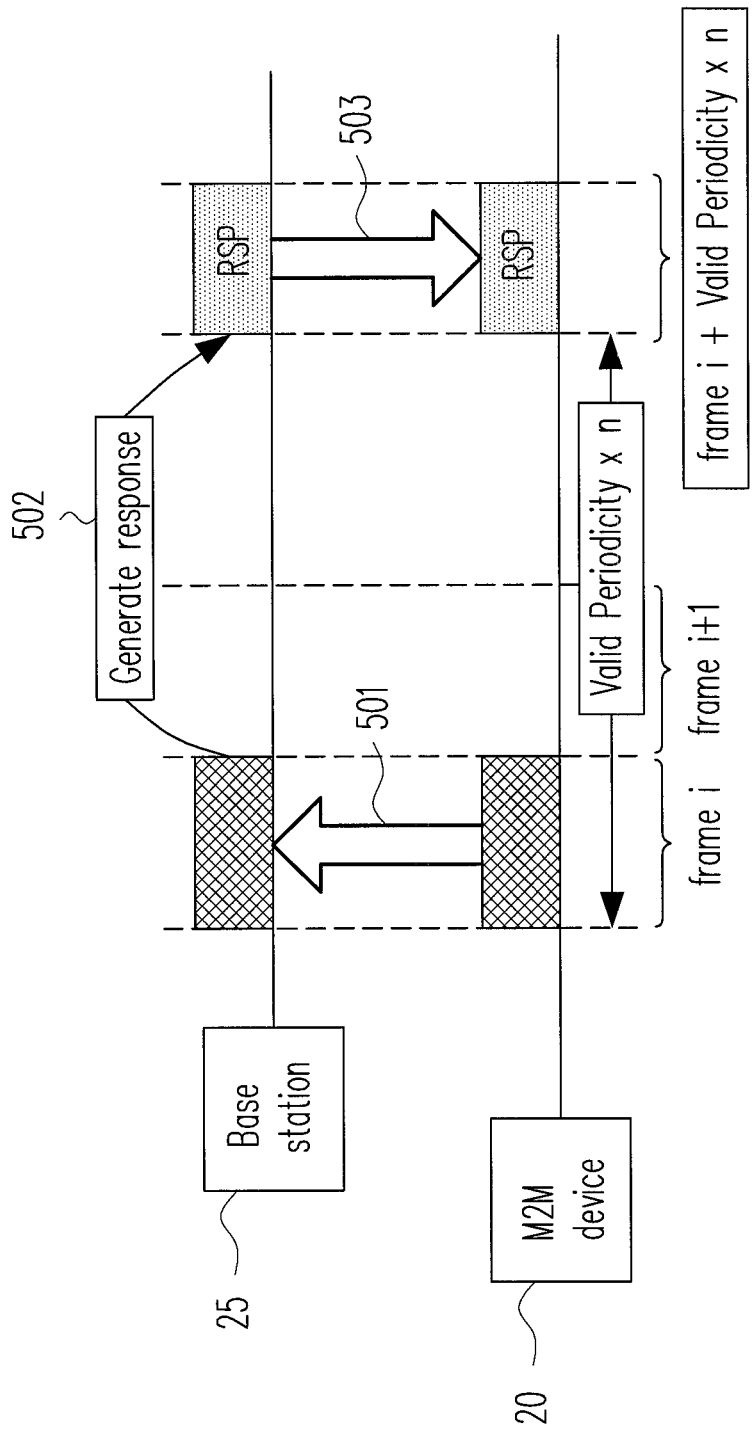
FIG. 5 illustrates a response of a base station in a valid frame according to an exemplary embodiment.

For example, FIG. 5 illustrates a response of a base station in a valid frame according to an exemplary embodiment. Initially, the M2M device 20 transmits a signal to the base station 25 in a frame 'i' (the frame with a frame sequence number of 'i') (step 501), so the base station 25 may generate a response (step 502) but cannot transmit the response until the base station 25 wait for a time period equal to 'Valid Periodicity×n' frames. Then, the base station 25 transmits the response (RSP) to the M2M device 20 (step 503) in frame 'i+Valid Periodicity×n'.

The base station may be able to know the application type of an M2M device during or before the registration process. The application type of an M2M device can be known through the negotiation between the base station and the network entity, or can be known through the negotiation between the base station and the M2M device. Some M2M applications can tolerate long traffic delay while some other M2M applications can allow only very limited traffic delay (which means delay-sensitive). Therefore, in the present disclosure, the base station can assign the value of a Valid Periodicity parameter to an M2M device according to device's application type. The base station should assign a small Valid Periodicity parameter to the M2M device with delay-sensitive application and assign a comparatively large Valid Periodicity parameter to the M2M device with delay-tolerable application.

For example, Table I shows a light load selection on Valid Periodicity. As indicated in Table I, the application type of an alarm system is the most delay-sensitive; the application type of digital billboard is the second most delay-sensitive; the application type of a utility metering is more delay-tolerant than that of the digital billboard; and the application type of vending machine is the most delay-tolerant. Therefore, the base station can assign a larger value (e.g., 8) to the Valid Periodicity parameter for the M2M device belonging to the application of vending machine than that (e.g., 4) of the utility metering. Similar, the base station can assign a smaller value (e.g., 1) to the Valid Periodicity parameter for the M2M device belonging to the application of the alarm system than that (e.g., 2) of the digital billboard.

TABLE I

Light load selection on valid periodicity

| | Application Type | | | |
|---|---|---|---|---|
| | Alarm system | Digital billboard | Utility metering | Vending machine |
| Valid Periodicity | 1 | 2 | 4 | 8 |

From another perspective, the base station can also adaptively change the Valid Periodicity parameter for one or more wireless communication devices sharing the identical device identifier according to device density within service coverage of the base station.

TABLE II

Medium load selection on valid periodicity

| | Application Type | | | |
|---|---|---|---|---|
| | Alarm system | Digital billboard | Utility metering | Vending machine |
| Valid Periodicity | 1 | 4 | 8 | 16 |

TABLE III

Heavy load selection on valid periodicity

| | Application Type | | | |
|---|---|---|---|---|
| | Alarm system | Digital billboard | Utility metering | Vending machine |
| Valid Periodicity | 1 | 8 | 16 | 32 |

For example, Table II and Table III respectively show a medium load selection and a heavy load selection on Valid Periodicity assigned to M2M applications. When the device density is increased from the light load to the medium load, the base station can increase the value of the Valid Periodicity parameter for the application types of the digital billboard, the utility metering and the vending machine. Similarly, when the device density is increased from the medium load to the heavy load, the base station can increase the value of the Valid Periodicity parameter for the application types of the digital billboard, the utility metering and the vending machine.

Once the base station associates a STID with a Valid Periodicity parameter, the other M2M devices sharing the same STID will be assigned the same Valid Periodicity parameter.

Since the Valid Offset for each M2M device sharing the same STID shall be unique, the value of Valid Periodicity parameter can represent the maximum number of M2M devices that can share the STID. It is noted that both Valid Periodicity parameter and Valid Offset parameter of an M2M device can be dynamically changed by the base station after negotiating with the M2M device.

Figure 6:
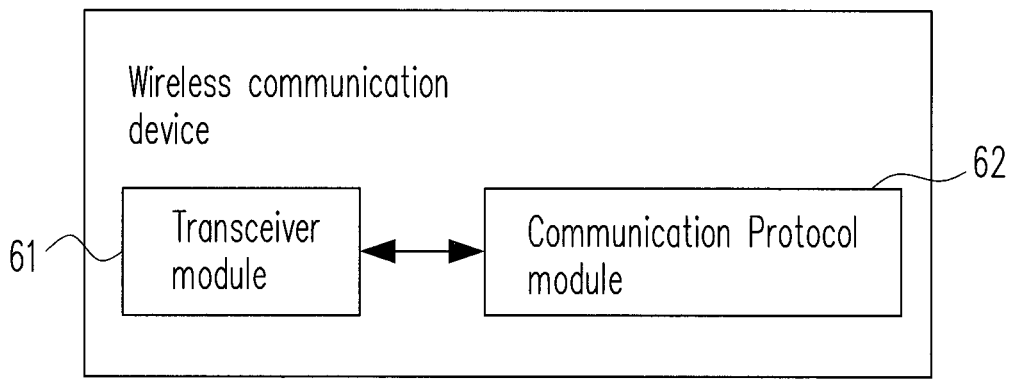
FIG. 6 is a functional block diagram illustrating a wireless communication device according to an exemplary embodiment.

FIG. 6 is a functional block diagram illustrating a wireless communication device according to an exemplary embodiment. Referring to FIG. 6, a wireless communication device 60 includes a transceiver module 61 and a communication protocol module 62. The transceiver module 61 is configured for transmitting signals to a base station and receiving signals from the base station. The communication protocol module 62 is connected to the transceiver module 61, and configured for performing network entry process, receiving downlink transmission from the base station, requesting for uplink bandwidth grant from the base station, and performing uplink transmission. In addition, the wireless communication device 60 can include other components (not illustrated) such as a processor module, a memory module, and an antenna module for processing signals from at least one base station.

Figure 7:
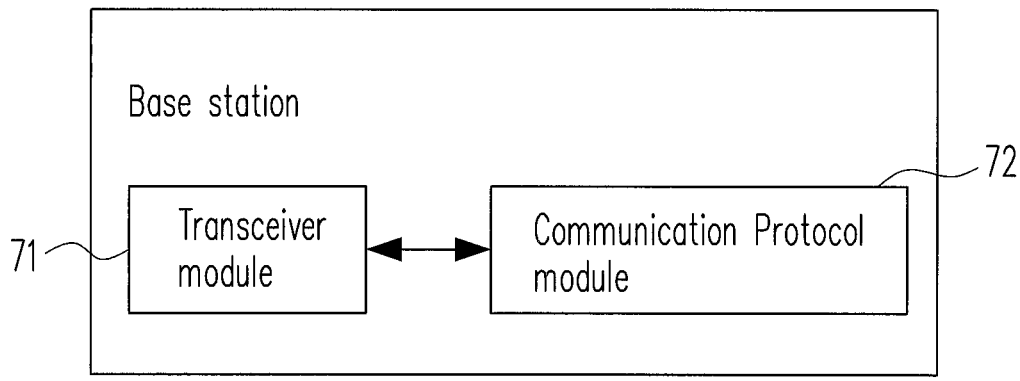
FIG. 7 is a functional block diagram illustrating a base station according to an exemplary embodiment.

FIG. 7 is a functional block diagram illustrating a base station according to an exemplary embodiment. A base station 70 includes a transceiver module 71 and a communication protocol module 72. The transceiver module 71 is configured for transmitting signals to and receiving signals from one or more wireless communication devices within its radio service coverage. The communication protocol module 72 is connected to the transceiver module 71, and configured for processing network entry request of the wireless communication devices within its radio server coverage, performing downlink transmission, processing uplink bandwidth request from wireless communication devices within its radio server coverage, and receiving uplink transmission. In addition, the base station 70 can include other components (not illustrated) such as a processor module, a memory module, a fixed network module and an antenna module for connecting to other entities in the wireless communication network as well as processing signals from one or more wireless communication devices within its radio service coverage.

Figure 8:
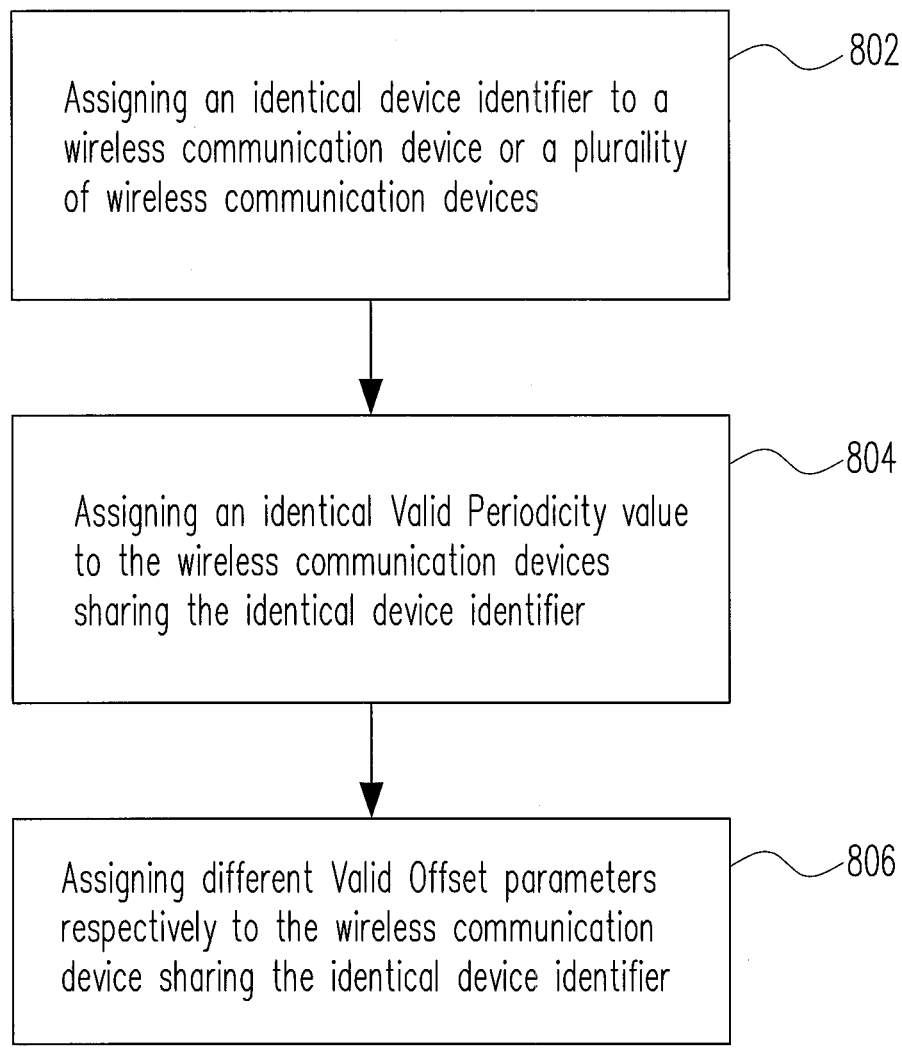
FIG. 8 is a flowchart illustrating an identifier-sharing method for wireless communication devices according to an exemplary embodiment.

FIG. 8 is a flowchart illustrating an identifier-sharing method for wireless communication devices according to an exemplary embodiment. Referring to both FIG. 7 and FIG. 8, the proposed identifier-sharing method for wireless communication devices initiates from step 802. In the step 802, the communication protocol module 72 of the base station 70 assigns an identical device identifier to one or more wireless communication device. In step 804, the communication protocol module 72 assigns an identical Valid Periodicity parameter to the wireless communication devices sharing the identical device identifier. In step 806, the communication protocol module 72 assigns different Valid Offset parameters respectively to the wireless communication devices sharing the identical device identifier.

In the present embodiment, when the base station 70 receives a bandwidth request message, which requests for additional bandwidth for uplink transmission, from one of the wireless communication devices within the radio service coverage of the base station 70, the communication protocol module 72 grants the additional bandwidth at one frame or a plurality of frames where the device identifier is valid for the wireless communication device that makes the bandwidth request message. The bandwidth request message includes at least a device identifier, an assigned Valid Offset parameter, and a required bandwidth size.

From one perspective, in the present embodiment, the communication protocol module 72 assigns a first Valid Periodicity parameter to a first group including one or more wireless communication devices associated with one or more delay sensitive applications, and assigns a second Valid Periodicity parameter to a second group including one or more wireless communication devices associated with one or more delay tolerable applications, where the value of the second Valid Periodicity parameter is larger than the value of the first Valid Periodicity parameter.

From another perspective, in the present embodiment, the communication protocol module 72 adaptively changes the Valid Periodicity parameter for the wireless communication devices sharing the identical device identifier according to device density within the radio service coverage of the base station 70. Also, the communication protocol module 72 increases the Valid Periodicity parameter when the device density of the base station 70 is increased, and decreases the Valid Periodicity parameter when the device density of the base station 70 is decreased.

Figure 9:
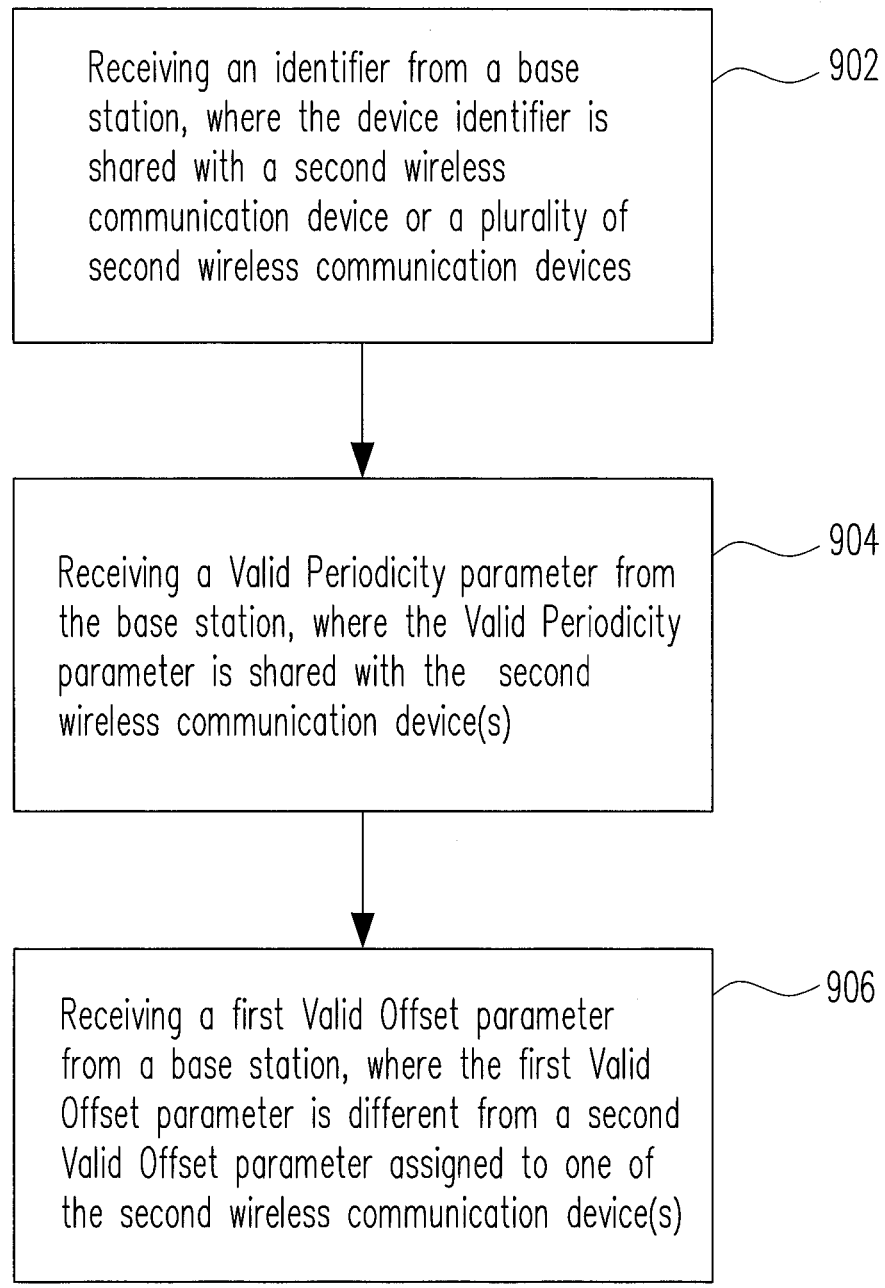
FIG. 9 is a flowchart illustrating another identifier-sharing method for wireless communication devices according to an exemplary embodiment.

FIG. 9 is a flowchart illustrating another identifier-sharing method for wireless communication devices according to an exemplary embodiment. Referring to both FIG. 6 and FIG. 9, the proposed identifier-sharing method for M2M devices initiates from step 902. In the step 902, the communication protocol module 62 of the wireless communication device 60 receives an identifier from a base station, where the device identifier is shared with another wireless communication device or a plurality of other wireless communication devices within the radio service coverage of the base station. In the step 904, the communication protocol module 62 receives a Valid Periodicity parameter from the base station, where the Valid Periodicity parameter is shared with the other wireless communication device(s). In the step 906, the communication protocol module 62 receives a first Valid Offset parameter assigned from the base station, where the first Valid Offset parameter is different from a second Valid Offset parameter assigned to one of the other wireless communication devices by the base station.

In the present embodiment, when the communication protocol module 62 transmits a bandwidth request message for additional bandwidth for uplink transmission to the base station, the bandwidth request message includes at least the device identifier, the required bandwidth size, and the first Valid Offset parameter.

FIG. 10 is a flowchart illustrating another identifier-sharing method for wireless communication devices according to an exemplary embodiment. Referring to both FIG. 6 and FIG. 10, the proposed identifier-sharing method for M2M devices initiates from step 1002. In the step 1002, the communication protocol module 62 of the wireless communication device 60 monitors downlink transmission or uplink transmission opportunity scheduled by a base station by using a device identifier along with a Valid Periodicity parameter and a Valid Offset parameter, where the device identifier, the Valid Periodicity parameter and the Valid Offset parameter are assigned by the base station during a network entry process.

In the present embodiment, the communication protocol module 62 monitors the downlink transmission or the uplink transmission opportunity scheduled at one or more frames satisfying the condition of equation (1). Also, when the communication protocol module 62 transmits a bandwidth request message for additional bandwidth for uplink transmission to the base station, the bandwidth request message includes at least the device identifier, the required bandwidth size, and the first Valid Offset parameter.

FIG. 11 is a flowchart illustrating another identifier-sharing method for wireless communication devices according to an exemplary embodiment. Referring to both FIG. 7 and FIG. 11, the proposed identifier-sharing method for M2M devices initiates from step 1102. In the step 1102, the communication protocol module 72 of the base station 70 schedules downlink transmission or uplink transmission opportunity of an M2M device according to a Valid Periodicity parameter and a Valid Offset parameter of the M2M device.

In the present embodiment, the communication protocol module 72 schedules the downlink transmission or the uplink transmission opportunity at frames satisfying the condition of equation (1). Also, when the communication protocol module 72 receives a bandwidth request message, which requests additional bandwidth for uplink transmission, from an M2M device, the communication protocol module 72 grants the additional bandwidth to the device identifier of the M2M device at frames where the device identifier is valid for the M2M device.

Further, the communication protocol module 72 assigns a first Valid Periodicity parameter to a first M2M group including one or more M2M devices associated with one or more delay sensitive applications, and assigns a second Valid Periodicity parameter to a second M2M group including one or more M2M devices associated with one or more a delay tolerable applications, where the second Valid Periodicity parameter is larger than the first Valid Periodicity parameter. The communication protocol module 72 changes the Valid Periodicity parameter for the M2M devices sharing the identical device identifier according to device density within the radio service coverage of the base station 70. In addition, the communication protocol module 72 increases the Valid Periodicity parameter when the Device density is increased, and decreases the Valid Periodicity parameter when the Device density is decreased.

In summary, according to the exemplary embodiments of the disclosure, identifier-sharing methods for wireless communication devices are proposed along with wireless communication devices and base stations using the same method. The proposed methods allow multiple M2M devices to share the same device identifier. The shared device identifier is valid for only one M2M device in a given time interval by a mechanism of assigning the same periodicity value and different offset values to the M2M devices associated with the shared device identifier. The proposed methods can also categorize M2M devices into different classes respectively based on their M2M application types. By adjusting valid periodicity value associated with the shared device identifier, a class associated with delay-tolerable applications can be allocated with more M2M devices sharing the same device identifier in comparison to the another class associated with delay-sensitive applications.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An identifier-sharing method for wireless communication devices, comprising:
assigning, at a base station, an identical device identifier simultaneously to a plurality of wireless communication devices, wherein each of the wireless communication devices comprises one or more machine to machine (M2M) devices;
assigning, at the base station, an identical valid periodicity parameter to all of the M2M devices sharing the identical device identifier; and
assigning, at the base station, different valid offset parameters respectively to the all of the M2M devices sharing the identical device identifier to periodically and legally reuse the identical device identifier,
wherein the valid periodicity parameter is an integer and is equal to or larger than a quantity of all of the M2M devices sharing the identical device identifier, and each of the valid offset parameters is an integer and is within the range between zero and the valid periodicity parameter subtracted by 1.

2. The identifier-sharing method for wireless communication devices according to claim 1, wherein when the base station receives a bandwidth request message, which requests additional bandwidth for uplink transmission, from one of the plurality of wireless communication devices, the base station grants the additional bandwidth at frames where the device identifier is valid for the wireless communication device that makes the bandwidth request message.

3. The identifier-sharing method for wireless communication devices according to claim 2, wherein the bandwidth request message comprises at least a device identifier, an assigned valid offset parameter, and a required bandwidth size.

4. The identifier-sharing method for wireless communication devices according to claim 1, wherein the base station assigns a first valid periodicity parameter to a first group comprising a first plurality of M2M devices associated with at least a delay sensitive application, and assigns a second valid periodicity parameter to a second group comprising a second plurality of associated with at least a delay tolerable application, wherein the second valid periodicity parameter is larger than the first valid periodicity parameter.

5. The identifier-sharing method for wireless communication devices according to claim 1, wherein the base station changes the valid periodicity parameter for the M2M devices sharing the identical device identifier according to device density within service coverage of the base station.

6. The identifier-sharing method for wireless communication devices according to claim 5, wherein the base station increases the valid periodicity parameter when the device density is increased, and decreases the valid periodicity parameter when the device density is decreased.

7. A base station, adapted for assigning identifiers to wireless communication devices, comprising:
a transceiver module, configured for receiving signals from and transmitting signals to a plurality of wireless communication devices, wherein each of the communication device comprises one or more the machine to machine (M2M) devices;
a communication protocol module, connected to the transceiver module, configured for assigning an identical device identifier simultaneously to M2M devices, and assigning an identical valid periodicity parameter to all of the M2M devices sharing an identical device identifier, and assigning different valid offset parameters respectively to the M2M devices sharing the identical device identifier to periodically and legally reuse the identical device identifier, wherein the valid periodicity parameter is an integer and is equal to or larger than a quantity of all of the M2M devices sharing the identical device identifier, and each of the valid offset parameters is an integer and is within the range between zero and the valid periodicity parameter subtracted by 1.

8. The base station according to claim 7, wherein when the base station receives a bandwidth request message, which requests additional bandwidth for uplink transmission, from one of the wireless communication devices, the communication protocol module grants the additional bandwidth at frames where the device identifier is valid for the wireless communication device that makes the bandwidth request message.

9. The base station according to claim 7, wherein the communication protocol module assigns a first valid periodicity parameter to a first group comprising a first plurality of M2M devices associated with at least a delay sensitive application, and assigns a second valid periodicity parameter to a second group comprising a second plurality of M2M devices associated with at least a delay tolerable application, wherein the second valid periodicity parameter is greater than the first valid periodicity parameter.

10. The base station according to claim 7, wherein the communication protocol module changes the valid periodicity parameter for the M2M devices sharing the identical device identifier according to device density within service coverage of the base station.

11. An identifier-sharing method for wireless communication devices, comprising:
receiving, at a first wireless communication device, a device identifier from a base station, wherein the device identifier is simultaneously shared with a second wireless communication device, wherein each of the first and the second wireless communication devices comprises one or more machine to machine (M2M) devices;
receiving, at the first wireless communication device, a valid periodicity parameter from the base station, wherein the valid periodicity parameter is simultaneously shared with the second wireless communication device; and
receiving, at the first wireless communication device, a first valid offset parameter assigned from the base station, wherein the first valid offset parameter is different from a second valid offset parameter assigned to the second wireless communication device by the base station so as to periodically and legally reuse the identical device identifier, wherein the valid periodicity parameter is an integer and is equal to or larger than a quantity of all of the M2M devices sharing the identical device identifier, and each of the first and the second valid offset parameters is an integer and is within the range between zero and the valid periodicity parameter subtracted by 1.

12. The identifier-sharing method for wireless communication devices according to claim 11, wherein when the first wireless communication device transmits a bandwidth request message for additional bandwidth for uplink transmission to the base station, the bandwidth request message comprises at least the device identifier, a required bandwidth size, and the first valid offset parameter.

13. A wireless communication device, comprising:
a transceiver module, configured for receiving signals from a base station and transmitting signals to the base station; and
a communication protocol module, connected to the transceiver module, configured for receiving a device identifier and a valid periodicity parameter from the base station, wherein the device identifier is simultaneously shared with a second wireless communication device and each of the first and the second wireless communication device comprises one or more machine to machine (M2M) devices, and receiving a first valid offset parameter from the base station, wherein the wireless communication device shares the first valid periodicity parameter with the second wireless communication device, but the first valid offset parameter is different from a second valid offset parameter assigned to the second wireless communication device by the base station so as to periodically and legally reuse the identical device identifier, where the valid periodicity parameter is an integer and is equal to or larger than a quantity of all of the M2M devices sharing the identical device identifier, and each of the first and the second valid offset parameters is an integer and is within the range between zero and the valid periodicity parameter subtracted by 1.

14. The wireless communication device according to claim 13, wherein when the communication protocol module transmits a bandwidth request message for additional bandwidth for uplink transmission to the base station, the bandwidth request message comprises at least the device identifier, a required bandwidth size, and the first valid offset parameter.

15. An identifier-sharing method for wireless communication devices, comprising:
monitoring, at a wireless communication device, downlink transmission or uplink transmission opportunity scheduled by a base station by using a device identifier along with a first valid periodicity parameter and a first valid offset parameter,
wherein the device identifier is shared by the wireless communication device and another communication device,
wherein the first valid periodicity parameter of the wireless communication device is identical to a second valid periodicity parameter of the other communication device,
wherein the first valid offset parameter of the wireless communication device is different from a second valid offset parameter of the other wireless communication device,
wherein the first valid periodicity parameter is an integer and is equal to or larger than a quantity of all of the wireless communication device and the other communication device sharing the device identifier, and the first valid offset parameter is an integer and is within the range between zero and the first valid periodicity parameter subtracted by 1.

16. The identifier-sharing method for wireless communication devices according to claim 15, wherein the step of monitoring the downlink transmission or the uplink transmission opportunity comprises:
monitoring, at the wireless communication device, the downlink transmission or the uplink transmission opportunity scheduled at frames satisfying a condition of a following equation:

$$FRAME_{NUMBER} \bmod Valid\_Periodicity = Valid\_Offset,$$

wherein $FRAME_{NUMBER}$ refers to frame sequence numbers of the frames, mod refers to a modulo function, Valid_Periodicity refers to the valid periodicity parameter, and Valid_Offset refers to the valid offset parameter.

17. The identifier-sharing method for wireless communication devices according to claim 15, wherein when the wireless communication device transmits a bandwidth request message for additional bandwidth for uplink transmission to the base station, the bandwidth request message comprises at least the device identifier, a required bandwidth size, and the first valid offset parameter.

18. A wireless communication device, comprising:
a transceiver module, configured for receiving signals from a base station and transmitting signals to the base station; and
a communication protocol module, connected to the transceiver module, configured for monitoring downlink transmission or uplink transmission opportunity scheduled by a base station by using a device identifier along with a first valid periodicity parameter and a first valid offset parameter,
wherein the device identifier is shared by the wireless communication device and another communication device,
wherein the first valid periodicity parameter of the wireless communication device is identical to a second valid periodicity parameter of the other communication device,
wherein the first valid offset parameter of the wireless communication device is different from a second valid offset parameter of the other wireless communication device,
wherein the first valid periodicity parameter is an integer and is equal to or larger than a quantity of all of the wireless communication device and the other communication device sharing the device identifier, and the first valid offset parameter is an integer and is within the range between zero and the first valid periodicity parameter subtracted by 1.

19. The wireless communication device according to claim 13, wherein the communication protocol module monitors the downlink transmission or the uplink transmission opportunity scheduled at frames satisfying a condition of a following equation:

$$\text{FRAME}_{NUMBER} \bmod \text{Valid\_Periodicity} = \text{Valid\_Offset},$$

wherein $\text{FRAME}_{NUMBER}$ refers to frame sequence numbers of the frames, mod refers to a modulo function, Valid_Periodicity refers to the valid periodicity parameter, and Valid_Offset refers to the valid offset parameter.

20. An identifier-sharing method for wireless communication devices, comprising:
scheduling, at a base station, downlink transmission or uplink transmission opportunity of a wireless communication device according to a first valid periodicity parameter and a first valid offset parameter of the wireless communication device,
wherein the device identifier is shared by the wireless communication device and another communication device,
wherein the first valid periodicity parameter of the wireless communication device is identical to a second valid periodicity parameter of the other communication device,
wherein the first valid offset parameter of the wireless communication device is different from a second valid offset parameter of the other wireless communication device,
wherein the first valid periodicity parameter is an integer and is equal to or larger than a quantity of all of the wireless communication device and the other communication device sharing the device identifier, and the first valid offset parameter is an integer and is within the range between zero and the first valid periodicity parameter subtracted by 1.

21. The identifier-sharing method for wireless communication devices according to claim 20, wherein the base station schedules the downlink transmission or the uplink transmission opportunity at frames satisfying a condition of a following equation:

$$\text{FRAME}_{NUMBER} \bmod \text{Valid\_Periodicity} = \text{Valid\_Offset},$$

wherein $\text{FRAME}_{NUMBER}$ refers to frame sequence numbers of the frames, mod refers to a modulo function, Valid_Periodicity refers to the valid periodicity parameter, and Valid_Offset refers to the valid offset parameter.

22. The identifier-sharing method for wireless communication devices according to claim 20, wherein when the base station receives a bandwidth request message, which requests additional bandwidth for uplink transmission, from the wireless communication device, the base station grants the additional bandwidth to the device identifier of the wireless communication device at frames where the device identifier is valid for the wireless communication device.

23. The identifier-sharing method for wireless communication devices according to claim 20, the base station assigns a first valid periodicity parameter to a first M2M group comprising at least an M2M device associated with at least a delay sensitive application, and assigns a second valid periodicity parameter to a second M2M group comprising at least an M2M device associated with at least a delay tolerable application, wherein the second valid periodicity parameter is larger than the first valid periodicity parameter.

24. The identifier-sharing method for wireless communication devices according to claim 20, wherein the base station changes the valid periodicity parameter for at least a M2M device sharing the identical device identifier according to the device density.

25. The identifier-sharing method for wireless communication devices according to claim 24, wherein the base station increases the valid periodicity parameter when the device density is increased, and decreases the valid periodicity parameter when the device density is decreased.

26. A base station, comprising:
a transceiver module, configured for receiving signals from at least a wireless communication device and transmitting signals to the at least a wireless communication device; and
a communication protocol module, connected to the transceiver module, configured for scheduling downlink transmission or uplink transmission opportunity of a wireless communication device according to a first valid periodicity parameter and a first valid offset parameter of the wireless communication device wherein the device identifier is shared by the wireless communication device and another communication device,
wherein the first valid periodicity parameter of the wireless communication device is identical to a second valid periodicity parameter of the other communication device,
wherein the first valid offset parameter of the wireless communication device is different from a second valid offset parameter of the other wireless communication device,
wherein the first valid periodicity parameter is an integer and is equal to or larger than a quantity of all of the wireless communication device and the other communication device sharing the device identifier, and the first valid offset parameter is an integer and is within the range between zero and the first valid periodicity parameter subtracted by 1.

27. The base station according to claim 26, wherein the communication protocol module schedules the downlink transmission or the uplink transmission opportunity at frames satisfying a condition of a following equation:

$$FRAME_{NUMBER} \bmod Valid\_Periodicity = Valid\_Offset,$$

wherein $FRAME_{NUMBER}$ refers to frame sequence numbers of the frames, mod refers to a modulo function, Valid_Periodicity refers to the valid periodicity parameter, and Valid_Offset refers to the valid offset parameter.

28. The base station according to claim 26, wherein when the communication protocol module receives a bandwidth request message, which requests additional bandwidth for uplink transmission, from the wireless communication device, the base station grants the additional bandwidth to the device identifier of the wireless communication device at frames where the device identifier is valid for the wireless communication device.

\* \* \* \* \*